United States Patent Office 2,795,131
Patented June 11, 1957

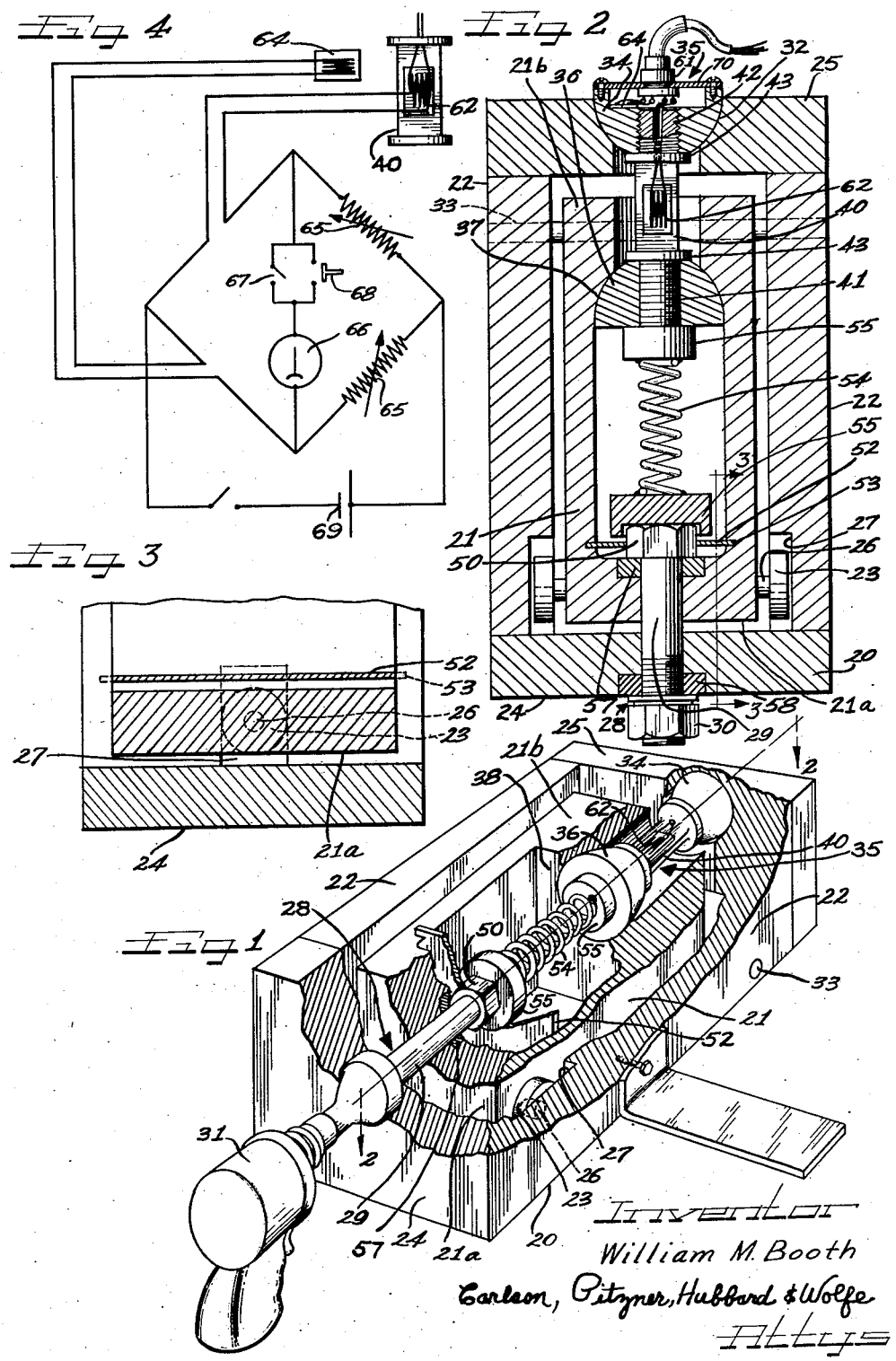

2,795,131

TORQUE MEASURING MEANS

William M. Booth, Grand Haven, Mich., assignor, by mesne assignments, to Gardner-Denver Company, a corporation of Delaware Application July 14, 1954, Serial No. 443,375

8 Claims. (Cl. 73—1)

The present invention relates to torque measuring devices and more particularly to devices for calibrating air driven torque producing tools or the like.

It is an object of the invention to provide means for testing and calibrating torque producing tools such as impact wrenches and nutsetters which is more accurate and consistent than devices conventionally used for this purpose. It is a more specific object of the invention to provide a torque measuring device which derives accuracy and consistency from the use of pure tensive forces in elongating a strain member, such forces being made possible by a unique means for self-alignment of the significant tensile elements.

It is another object of the invention to provide a torque measuring arrangement as applied to bolt and nut assemblies which employs a novel replaceable strain member which may be interchanged with differently sized strain members to vary the desired range of the apparatus, thereby providing for a constant degree of accuracy throughout various ranges that has been hitherto unattainable. It is an object related to the foregoing to provide a torque measuring means which employs strain members which may be easily replaced upon being permanently deformed without the burden of replacing the entire device.

It is a further object of the invention to provide a torque measuring device which may be used as a secondary torque standard enabling impact wrenches and nutsetters to be adjusted for specified torque under actual working conditions and when used with a predetermined size of bolt and nut assembly. It is a more detailed object to provide a torque measuring apparatus which may be easily calibrated with a standard "Jo"-wrench and which is particularly suitable for accurate adjustment of impact wrenches and the like under production line conditions.

It is a correlative object of the invention to provide an apparatus for measuring the torque developed by impact wrenches, nutsetters and the like under actual conditions of operation rather than under a separate set of testing conditions, the establishment of which is often costly and inconvenient.

Still another object of the invention is to provide a force measuring strain assembly which is particularly well suited for use with electrical detectors and indicators but which may be universally employed and used with but minor modification in connection with other types of detectors and indicators to measure and indicate the elongation of the strain member caused by an applied torque.

It is another object of the invention to provide an improved torque analyzing device which is independent of variations in ambient temperature and retains its accuracy and consistency despite variations in such temperature. More generally stated it is an object to provide a device for torque analysis of bolt and nut assemblies which is compact, durable and stable and which retains accurate calibration in spite of the repeated jarring action of an impact wrench or nutsetter.

Finally, it is an object to provide a torque measuring device for nut and bolt assemblies which is inexpensive, which is easily set up and adjusted, and which requires a minimum of care and maintenance.

Other objects and advantages will become apparent upon reading the attached detailed description and upon reference to the drawings, in which:

Figure 1 is a perspective of the device employed in practicing the present invention as used with an impact wrench.

Fig. 2 is a longitudinal section taken along the line 2—2 in Fig. 1.

Fig. 3 is a fragmentary section taken along the line 3—3 in Fig. 2.

Fig. 4 is a schematic diagram of the circuit employed in practicing the present invention.

While the invention has been described in connection with a preferred embodiment, it will be understood that I do not intend to limit the invention thereto, but intend to cover all modifications and alternative constructions falling within the spirit and scope of the appended claims.

Turning now to the drawings, the device includes a box shaped supporting frame 20 comprising two sides 22 and two ends 24 and 25. The remaining two opposite sides are left open to allow access to the interior. Arranged within the frame is a rectangular yoke 21 having ends 21a and 21b and which nearly completely fills the space within the frame. The yoke 21 is held in rolling engagement with the supporting frame 20 by roller guides 23, one on each side of the yoke 21, and which are secured to the yoke 21 by suitable transverse roller axles 26. The roller guides 23 ride in guide slots 27 provided in the inside surfaces of the sides 22 of the supporting frame.

The end 24 of the supporting frame and the end 21a of the yoke 21 are provided with aligned axial holes for reception of a bolt and nut assembly 28 including a bolt 29 and a nut 30. When the bolt 29 is in place, the nut 30, in threaded engagement therewith, is outside of the supporting frame 20 so as to be readily accessible for engagement by a wrench 31.

In accordance with the present invention I provide a tensile strain assembly between the ends 25 and 21b of the frame and the yoke arranged coaxially with the bolt 29 and having provision for self alignment. As shown in the drawings, the tensile strain assembly indicated generally at 35 includes a rectangular strain member 40. A ball and socket connection is provided at each end of the strain member. Referring to the outer end of the strain assembly 35, the end 25 of the supporting frame is provided with a centrally located hole running therethrough which hole matures at the outer surface of the end 25 into a socket 32 which receives a ball support 34. Similarly the end 21b of the yoke 21 contains a centrally located hole running therethrough and aligned with the hole in the end 25 of the supporting frame. The inner end of the strain assembly 35 comprises a ball support 36 which rests in a socket 37 contained in the inner surface of the end 21b of the yoke 21.

The ball supports 34 and 36 are centrally tapped completely therethrough for engagement with the threaded ends 41 and 42 of the strain member 40 which is held between said ball supports. The strain member 40 is rectangularly shaped with a small cross section relative to its length. The threaded ends 41 and 42 are integral with the central strain portion of the strain member 40 and are set off therefrom by flanges 43 which receive the flattened ends of the ball supports 34 and 36.

For the purpose of holding the bolt head 50 secure from rotation upon application of torque to the nut 30, a rectangular metal locking plate 52 is provided. A hexagonal opening in the locking plate 52 fits over the bolt head, and the dimensions of the locking plate are such that it fits snugly into the yoke opening in transverse relationship. The locking plate 52 may if desired be provided with ears 53 to additionally hold the plate in position when the device is being used.

Annular inserts 57 and 58 are provided in the inner end 21a of the yoke 21 and in the end 24 of the supporting frame 20 to present a durable hardened surface to resist wear from the bolt head and nut respectively and to produce consistent results.

For the purpose of holding the end 21b of the yoke 21 in position relative to the supporting frame 20 when the bolt and nut assembly 28 is not under strain, a support pin 33 is provided running through the sides 22 of the supporting frame 20 and underneath the said end 21b of the yoke.

For the purpose of holding the bolt 29 seated in position when the nut 30 is loose or removed, a spring 54 with two end caps 55 welded thereto is provided.

Thus it is seen that the bolt and nut assembly 28, the yoke 21, the ball support 36, the strain member 40 and the ball support 34 are all in linear axial relationship to each other. The application of torque to the nut, for example, by an impact wrench, produces both tensile force and torque in the bolt 29 simulating actual working conditions. The torque is resisted by the plate 52 which, in the present embodiment, registers with the bolt head, and such torque is transmitted through the rollers 23 to the supporting frame 22. The tensile component of force is not transmitted to the frame but results in a tensive force throughout the above described linear system, which force produces a measurable strain in the strain member 40. In the present embodiment this strain is detected by an electric resistance type detector 62 which is attached to the strain member 40. Such detector comprises a sticker having a coil of fine wire extending primarily in the axial direction of the strain member 40 and which, upon stretching in response to elongation of the strain member, changes both in length and cross-sectional area and thus in electrical resistance.

In order to permit accurate torque measurements under all conditions of ambient temperature, a temperature compensator 64 is provided. This temperature compensator is preferably identical to the detector 62. In the preferred embodiment of the invention the temperature compensator is attached to the ball support 34 which is provided with a suitable recess for reception thereof. Thus the temperature compensator is mounted near the strain member 40 but with the coil of wire extending primarily in the transverse direction of the strain member so as to be unaffected by the elongation of said strain member.

A four terminal receptacle 61 secured to the end of the ball socket 34 by a plate 70 connects the lead wires from the temperature compensator 64 and the strain detector 62 with the circuit shown in Fig. 4.

The threaded end 42 of the strain member 40 is provided with a centrally disposed port running axially therethrough for passage of the lead wires from the strain detector 62 to said receptacle.

The operation of the present electrical circuit may be understood upon reference to Fig. 4 which shows a Wheatstone bridge in which the strain detector 62 and temperature compensator 64 form two of the legs and in which balancing resistors 65 form the other two legs. A strain indicator in the form of a microammeter 66 is connected across the output terminals and a voltage source 69 is connected across the input. In series with the indicator is a switch 67 shunted by a push button 68. The push button performs a protective function since it may be pressed momentarily to establish approximate balance.

Calibration of the device is accomplished by balancing the bridge at no load with the gauge included by adjusting one or both of the resistors 65 and then applying known torque loads to the bolt and nut assembly to determine the relationship between the torque exerted and the corresponding galvanometer deflections.

Torque producing tools used in production line operation usually are provided with means for adjusting the torque so that the torque applied to the workpiece is relatively constant from piece to piece without care on the part of the operator. Such adjustment may be brought about in several different ways. For example, in the case of an air driven impact wrench or nutsetter, the tool itself may include a torque adjustment or the air pressure may be adjusted by a suitable regulator.

Thus, when the device is used to adjust the air pressure on different production tools, the operator installs a nut and bolt assembly of the same size and type as that to be used in production in the position shown in the drawings. Any seating conditions peculiar to the production set up such as a rubber washer or a lock type washer or the like, are preferably included in the assembly. The assembly is then tightened to produce the desired torque with an inspector's torque wrench, commonly called a "Jo"-wrench, and the indicator reading is noted. A production tool is then substituted for the torque wrench and the operator regulates the air pressure for the tool until a like indicator reading is obtained. The tool is then ready for use in the production line with assurance that the bolt and nut assemblies will all be tightened to the predetermined degree.

The same technique may be applied to the adjustment of all power driven and manual torque producing devices.

While the invention has been described in connection with an electrical type detector or indicator, one skilled in the art will appreciate that the invention is not necessarily so limited and that the strain assembly may be employed with any sensitive means for measuring elongation and which may be suitably coupled to the strain member.

One of the features of the above described device is that the strain member may be easily removed from the device and another substituted therefor by simply unscrewing one of the ball supports. Similarly, the operator may remove and replace the bolt and nut assembly with a minimum of inconvenience. To replace the bolt 29, the nut 30 is unscrewed, the spring 54 removed and the bolt lifted vertically from its seat and removed through the hollow yoke. A different sized bolt and nut may then be inserted by following the reverse procedure.

What is claimed is:

1. In a device for measuring torque as applied to bolt and nut assemblies, the combination comprising a frame providing a pair of spaced supports, a yoke contained between such supports and having ends in contiguous relation thereto, for limited endwise movement, a bolt and nut assembly for coupling one end of the yoke to one of said supports, a strain assembly including a longitudinal strain member for coupling the other end of the yoke to the other one of said supports, means for blocking rotation of the yoke relative to the frame and the strain member being in alignment with said bolt and nut assembly so that a pure tensive force is produced in the strain member upon application of torque to the nut and bolt assembly, and means for detecting and indicating elongation to the tensile strain member due to the applied torque.

2. In a device for measuring torque as applied to bolt and nut assemblies, the combination comprising a frame providing a pair of spaced supports, a yoke contained between such supports and having ends in contiguous relation thereto for limited endwise movement, a bolt and nut assembly for coupling one end of the yoke to one of said supports, a strain assembly including a longitudinal strain member for coupling the other end of the yoke to the other one of said supports, means for blocking rotation of the bolt relative to the frame, the strain member being in alignment with said bolt and nut assembly so that a pure tensive force is produced in the strain member upon application of torque to the nut and bolt assembly, said yoke being hollowed out between its ends to provide a clearance space into which the bolt may be axially withdrawn prior to removal thereof, and means for detecting and indicating elongation to the tensile strain member due to the applied torque.

3. In a device for measuring torque as applied to bolt and nut assemblies, the combination comprising means for supporting a bolt and nut assembly, a longitudinal strain member arranged so as to be generally aligned with the bolt, stationary mounting means at one end of said longitudinal strain member for stationarily anchoring the same, relatively movable mounting means at the opposite end of the strain member for connecting it to the bolt and nut assembly, means for blocking rotation of the movable mounting means upon application of torque to the nut and bolt assembly, at least one of said mounting means including a ball and socket connection so that a pure tensive force is produced in the strain member upon application of torque to the nut and bolt assembly, and means for detecting and indicating elongation of the tensile strain member due to the applied torque.

4. In a device for measuring torque as applied to bolt and nut assemblies, the combination comprising a frame, a bolt and nut assembly, a longitudinal strain member arranged so as to be generally aligned with the bolt, mounting means at one end of said longitudinal strain member for stationarily anchoring the same to the frame, mounting means including a yoke member at the opposite end of the strain member for providing coaxial connection to the bolt and nut assembly, means including a stationary shoulder on the frame for axially anchoring the bolt and nut assembly so that tensile force is set up in the bolt and in the strain member connected thereto when torque is applied to the bolt and nut assembly by a tool under test, means for preventing rotation of the yoke relative to the frame, and means for detecting and indicating elongation of the tensile strain member due to applied torque.

5. In a device for measuring torque as applied to bolt and nut assemblies, the combination comprising a box shaped frame, a box shaped yoke contained therein having ends facing the respective ends of the frame and spaced therefrom for limited endwise movement with respect thereto, a bolt and nut assembly for coupling together corresponding ends of said frame and yoke, a strain assembly including a longitudinal strain member interposed between the corresponding opposite ends of the frame and yoke and generally aligned with said bolt and nut assembly, means for blocking rotation of the yoke relative to the frame and said strain member having ball and socket connections for anchoring the same to the yoke and frame respectively so that a pure tensive force is produced in the strain member upon application of torque to the nut and bolt assembly and means for detecting and indicating elongation of the tensile strain member due to the applied torque.

6. In a device for measuring torque as applied to bolt and nut assemblies, the combination comprising a box shaped frame, a box shaped yoke contained therein having ends facing the respective ends of the frame and spaced therefrom for limited endwise movement with respect thereto, a bolt and nut assembly for coupling together corresponding ends of said frame and yoke, a strain assembly including a longitudinal strain member interposed between the corresponding opposite ends of the frame and yoke and generally aligned with said bolt and nut assembly, means for blocking rotation of the yoke relative to the frame, ball and socket connections at the respective ends of the strain member for anchoring the same to the yoke and frame respectively, at least one of said ball and socket connections being detachable from the strain member to permit endwise removal and substitution of the strain member and means for detecting and indicating in direction and magnitude the degree of strain produced in the strain member.

7. In a device for measuring torque as applied to bolt and nut assemblies, the combination comprising a box shaped frame, a box shaped yoke contained therein having ends contiguous to the ends of the frame for limited endwise movement of the yoke, a bolt and nut assembly for coupling together corresponding ends of said frame and yoke, a strain assembly including a longitudinal strain member interposed between the corresponding opposite ends of the frame and yoke and generally aligned with said bolt and nut assembly, means for blocking rotation of the yoke relative to the frame, ball and socket connections at the respective ends of the strain member for anchoring the same to the yoke and frame respectively to permit precise alignment of the strain member with the bolt and nut assembly so that a pure tensive force is produced in the strain member upon application of torque to the nut, means for holding the bolt secure from rotation relative to the yoke, and means for detecting and indicating in direction and magnitude the degree of strain produced in the strain member.

8. In a device for measuring torque as applied to bolt and nut assemblies, the combination comprising a box shaped frame, a box shaped yoke contained therein having ends contiguous to the ends of the frame for limited endwise movement of the yoke, a bolt and nut assembly for coupling together corresponding ends of said frame and yoke, a strain assembly including a longitudinal strain member interposed between the corresponding opposite ends of the frame and yoke and generally aligned with said bolt and nut assembly, means for blocking rotation of the yoke relative to the frame, ball and socket connections at the respective ends of the strain member for anchoring the same to the yoke and frame respectively to permit precise alignment of the strain member with the bolt and nut assembly so that a pure tensive force is produced in the strain member upon application of torque to the nut, means for holding the bolt secure from rotation relative to the yoke and means including a bridge circuit having an electrical resistance type detector and temperature compensator for determining the direction and magnitude of the degree of strain produced in the strain member.

References Cited in the file of this patent
UNITED STATES PATENTS

| | | |
|---|---|---|
| 2,030,464 | Nilson | Feb. 11, 1936 |
| 2,414,161 | Moore | Jan. 14, 1947 |
| 2,561,318 | Ruge | July 17, 1951 |
| 2,635,453 | Gentry et al. | Apr. 21, 1953 |
| 2,648,219 | Emery | Aug. 11, 1953 |
| 2,720,111 | Clark | Oct. 11, 1955 |